(12) United States Patent
Muroyama et al.

(10) Patent No.: US 10,809,997 B2
(45) Date of Patent: Oct. 20, 2020

(54) INFORMATION PROCESSING APPARATUS AND PROGRAM UPDATE CONTROL METHOD

(71) Applicant: FUJITSU LIMITED, Kawasaki-shi, Kanagawa (JP)

(72) Inventors: Tomohiko Muroyama, Kawasaki (JP); Noriyuki Yasu, Kawasaki (JP); Tadashi Matsumura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 238 days.

(21) Appl. No.: 15/296,358

(22) Filed: Oct. 18, 2016

(65) Prior Publication Data
US 2017/0139698 A1 May 18, 2017

(30) Foreign Application Priority Data
Nov. 18, 2015 (JP) .................................. 2015-225525

(51) Int. Cl.
| | |
|---|---|
| G06F 8/65 | (2018.01) |
| G06F 8/654 | (2018.01) |
| G06F 8/656 | (2018.01) |
| G06F 9/455 | (2018.01) |

(52) U.S. Cl.
CPC ............. *G06F 8/65* (2013.01); *G06F 8/654* (2018.02); *G06F 8/656* (2018.02); *G06F 9/45508* (2013.01); *G06F 9/45533* (2013.01)

(58) Field of Classification Search
CPC ............... H04L 41/082; G06F 11/1433; G06F 11/0709; G06F 8/65; G06F 11/2097; G06F 8/61; G06F 8/656; G06F 8/654; G06F 9/45508; G06F 9/45533
See application file for complete search history.

(56) References Cited

U.S. PATENT DOCUMENTS

| | | | | |
|---|---|---|---|---|
| 7,840,957 B2* | 11/2010 | Kumashiro | ............... | G06F 8/65 717/168 |
| 8,707,290 B2* | 4/2014 | Brundridge | ............... | G06F 8/65 709/209 |
| 9,021,459 B1* | 4/2015 | Qu | ........................... | G06F 8/65 710/33 |

(Continued)

FOREIGN PATENT DOCUMENTS

| | | |
|---|---|---|
| JP | 2001-216166 | 8/2001 |
| JP | 2004-318871 | 11/2004 |

(Continued)

*Primary Examiner* — S. Sough
*Assistant Examiner* — Cheneca Smith
(74) *Attorney, Agent, or Firm* — Fujitsu Patent Center

(57) ABSTRACT

In an information processing apparatus, an execution unit executes a first program and a second program. While the information processing apparatus acts as a slave that performs a program update process in response to instructions from a different information processing apparatus, an update control unit updates the first program to a first updated program as a program to be executed. While the information processing apparatus acts as a master that controls the program update process, the update control unit updates the second program to a second updated program as a program to be executed, and notifies a management apparatus of a progress state of the program update process according to the first program or first updated program.

6 Claims, 10 Drawing Sheets

(56) References Cited

U.S. PATENT DOCUMENTS

| | | |
|---|---|---|
| 2006/0036832 A1 | 2/2006 | Makiyama |
| 2007/0234332 A1* | 10/2007 | Brundridge ............... G06F 8/65 717/168 |
| 2007/0294684 A1* | 12/2007 | Kumashiro ............... G06F 8/65 717/168 |

FOREIGN PATENT DOCUMENTS

| | | |
|---|---|---|
| JP | 2009-042932 | 2/2009 |
| WO | 2004/081791 | 9/2004 |

* cited by examiner

INFORMATION PROCESSING APPARATUS AND PROGRAM UPDATE CONTROL METHOD

CROSS-REFERENCE TO RELATED APPLICATION

This application is based upon and claims the benefit of priority of the prior Japanese Patent Application No. 2015-225525, filed on Nov. 18, 2015, the entire contents of which are incorporated herein by reference.

FIELD

Embodiments discussed herein relate to an information processing apparatus and a program update control method.

BACKGROUND

Many processing apparatuses used in existing information processing systems operate with firmware. In some of the information processing systems, a management apparatus may be provided so that firmware is automatically updated under the management of the management apparatus, thereby achieving efficient firmware updates for each processing apparatus.

To update firmware, the following method may be employed: Two non-volatile storage areas are used for holding different versions of firmware, and when a processing apparatus is rebooted while an old version of the firmware stored in a first storage area is running, a new version of the firmware is read from a second storage area and is then executed. One of techniques proposed in connection with this method is to determine, after the reboot, whether the new version of the firmware stored in the second storage area is normal, and then to execute the new version of the firmware if it is determined normal, but to execute the old version of the firmware stored in the first storage area if it is determined abnormal.

In addition, in some information processing systems, processing apparatuses are configured redundantly so that the system is able to keep operating if a trouble occurs in one of the apparatuses or during a maintenance work, such as a firmware update. For example, the following system has been proposed: Control devices for controlling access to a logical storage area are configured redundantly, and when a host computer accesses one of the control devices while a control program is being updated in the one control device, the host computer is notified of information indicating a wait for a reboot. The host computer, having received the information, accesses the logical storage area via the other control device.

Please see, for example, Japanese Laid-open Patent Publication Nos. 2004-318871 and 2009-42932.

To update firmware for redundant processing apparatuses, for example, the firmware for one of the processing apparatuses is updated, and after the update is complete, the firmware for the other processing apparatus is updated. This makes it possible to update the firmware while either one of the processing apparatuses keeps performing usual processes.

In addition, the firmware update may involve reboots of the processing apparatuses, as described above. Therefore, the following method may be considered: One of redundant processing apparatuses is set as a master for controlling a firmware update and the other is set as a slave, and the master is caused to control the firmware update for the slave.

Now, the following case will be considered: A management terminal is connected only to one (called "first processing apparatus") of processing apparatuses, and the management terminal causes the first processing apparatus to initiate a firmware update, occasionally obtains information about the progress state of the firmware update, and displays the progress state on a display device for administrator's confirmation. In this case, for example, the first processing apparatus initially set as a master executes a sequence for the firmware update for the second processing apparatus in response to an instruction from the management terminal. When the execution of the sequence is complete, the roles of the master and the slave are switched, and the second processing apparatus now set as the master executes a sequence for the firmware update for the first processing apparatus. When the execution of the sequence is complete, the roles of the master and the slave are switched again, and the first processing apparatus now set as the master notifies the management terminal of the completion of the firmware update.

In this method, however, the first processing apparatus is unable to notify the management terminal of the progress state of the update while acting as the slave. Therefore, for example, if a trouble occurs when the firmware update is being performed in the first processing apparatus, it takes time for the administrator to notice the trouble and take countermeasures against it. Even if no trouble occurs, the administrator feels that there is no progress in the update, which reduces the usability.

Especially, in the case where plural sets of firmware run on each processing apparatus, it takes a long time to complete an update of these sets of firmware in the first processing apparatus acting as the slave. This problem becomes apparent, for example, in the case where a plurality of virtual Operating System (OS) programs run on each processing apparatus and these virtual OS programs are updated.

SUMMARY

According to one aspect, there is provided an information processing apparatus that executes programs. The information processing apparatus includes a memory configured to hold a first program, a second program, a first updated program, and a second updated program; and a processor configured to perform a procedure including: executing the first program and the second program stored in the memory; performing a first process of updating the first program to the first updated program, as a program to be executed, when the information processing apparatus acts as a slave that performs a program update process in accordance with an instruction from a different information processing apparatus; and performing a second process when the information processing apparatus acts as a master that controls the program update process, the second process including a process of updating the second program to the second updated program as a program to be executed, and a process of notifying a management apparatus of a progress state of the program update process according to the first program or the first updated program.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
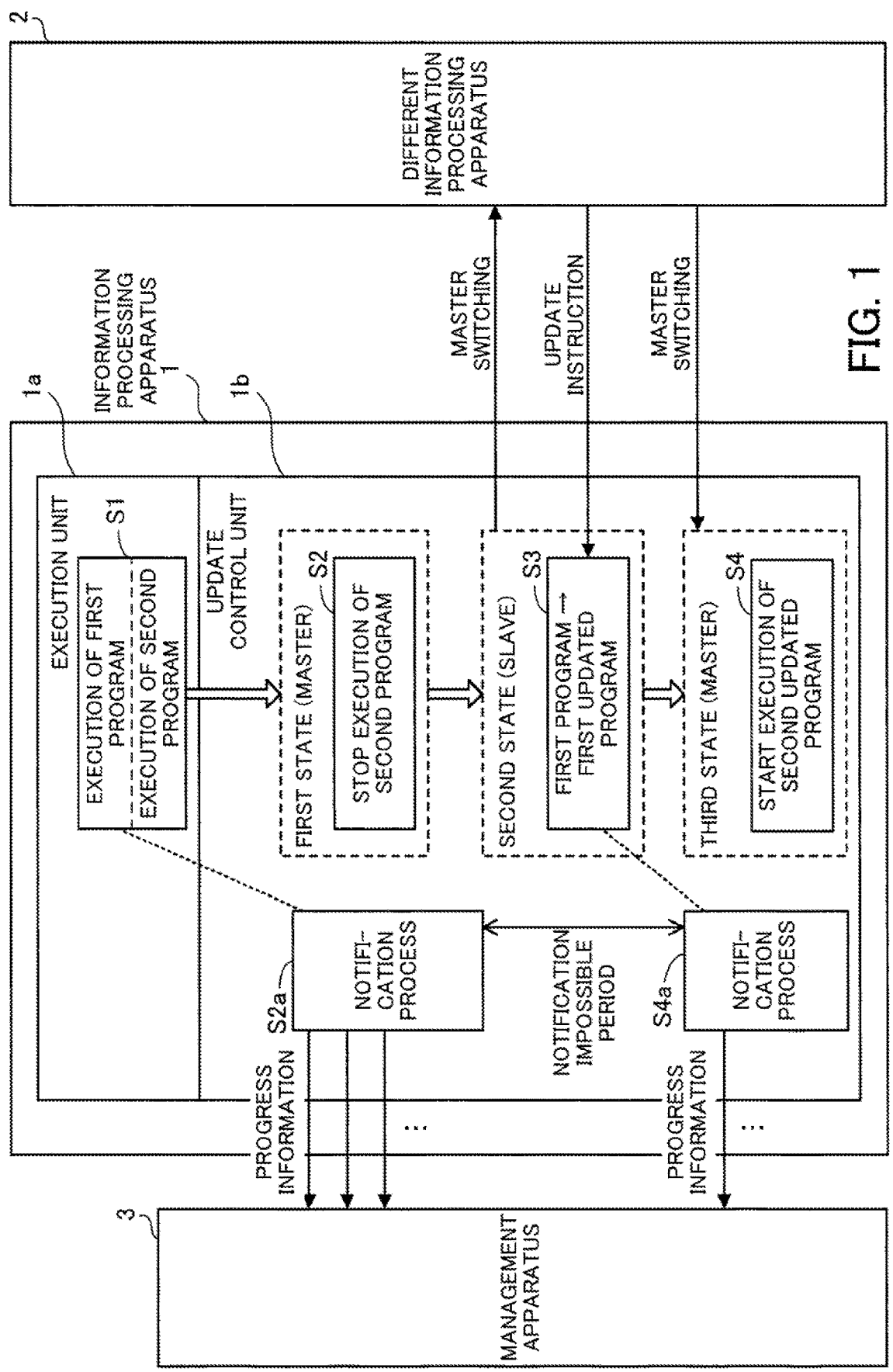
FIG. 1 illustrates an example of a configuration and processes of an information processing apparatus according to a first embodiment.

Several embodiments will be described below with reference to the accompanying drawings, wherein like reference numerals refer to like elements throughout.

First Embodiment

FIG. 1 illustrates an example of a configuration and processes of an information processing apparatus according to a first embodiment. An information processing apparatus 1 includes an execution unit 1a and an update control unit 1b. Processes of the execution unit 1a and update control unit 1b are implemented by, for example, causing a processor provided in the information processing apparatus 1 to execute prescribed programs.

A different information processing apparatus 2 and a management apparatus 3 are connected to the information processing apparatus 1. As will be described later, the different information processing apparatus 2 is able to control part of a program update process that is performed in the information processing apparatus 1. The management apparatus 3 receives progress information indicating a progress state of the program update process performed in the information processing apparatus 1, and notifies an administrator of the progress information via display information or the like.

The execution unit 1a executes a first program and a second program (step S1). When an update process for updating the first and second programs starts, the first program performs a process of notifying the management apparatus 3 of the above progress information. The information processing apparatus 1 is able to intermittently notify the management apparatus 3 of the progress information plural times according to the first program. For example, the information processing apparatus 1 notifies the management apparatus 3 of the progress information in response to a request that is sent at fixed time intervals from the management apparatus 3.

When an instruction to start the update process of the first and second programs is made by the management apparatus 3 while the first and second programs are running, for example, the update control unit 1b performs the following process. Note that the information processing apparatus 1 is able to switch between two operating roles: a master that allows the information processing apparatus 1 to control the update process by itself; and a slave that performs the update process in accordance with instructions from the different information processing apparatus 2.

The update control unit 1b performs a process of updating the first program to a first updated program, as a program to be executed, when the information processing apparatus 1 acts as the slave. The first updated program is a newer version of the first program.

In addition, the update control unit 1b performs a process of updating the second program to a second updated program, as a program to be executed, when the information processing apparatus 1 acts as the master. The second updated program is a newer version of the second program.

When the information processing apparatus 1 acts as the master, the information processing apparatus 1 controls the update process by itself. Therefore, the update control unit 1b is able to perform a notification process for notifying the management apparatus 3 of progress information according to the first program or the first updated program. When the information processing apparatus 1 acts as the slave, the information processing apparatus 1 itself does not control the update process. Therefore, the update control unit 1b is unable to perform the notification process for notifying the management apparatus 3 of progress information according to the first program or the first updated program.

The update control unit 1b updates only the first program that is related to the notification process for progress information when the information processing apparatus 1 acts as the slave, and updates the second program when the information processing apparatus 1 acts as the master. This achieves a reduction in the time period during which it is not possible to notify the management apparatus 3 of progress information.

Referring to the example of FIG. 1, the process of updating the second program to the second updated program is divided into steps S2 and S4. Step S2 is executed in a first state where the information processing apparatus 1 acts as the master, whereas step S4 is executed in a third state where the information processing apparatus 1 acts as the master. At step S3 between steps S2 and S4, the process of updating the first program to the first updated program as a program to be executed is performed. Step S3 is executed in a second state where the information processing apparatus 1 acts as the slave.

More specifically, in the first state, the update control unit 1b stops the execution of the second program (step S2). At this time, the first program keeps running and therefore the update control unit 1b performs the notification process for progress information according to the first program (step S2a).

Then, the update control unit 1b switches the role of the information processing apparatus 1 from the master to the slave, and the role of the different information processing apparatus 2 from the slave to the master. Thereby, the state transitions to the second state. In the second state, in response to instructions from the different information processing apparatus 2, the update control unit 1b stops the execution of the first program, and then starts to execute the first updated program (step S3), which means that the first program has been updated. In the second state, the notification process for progress information is stopped.

Then, the update control unit 1b switches the role of the information processing apparatus 1 from the slave to the master in response to an instruction from the different information processing apparatus 2. Thereby, the state transitions to the third state. In the third state, the update control unit 1b starts to execute the second updated program (step S4), which means that the second program has been updated. In addition, the transition to the third state ends the time period during which it is not possible to make a notification of progress information. Therefore, the update control unit 1b resumes the notification process for progress information according to the first updated program (step S4a).

As described above, in the second state where the information processing apparatus 1 acts as the slave, only the process of updating the first program is performed. The process of updating the second program is performed in the first and third states where the information processing apparatus 1 acts as the master. This achieves a reduction in the time period during which it is not possible to notify the management apparatus 3 of progress information.

In this connection, a notification of progress information on the update process may not be sent to the management apparatus 3. For example, the notification of progress information may be sent to a display device connected to or provided in the information processing apparatus 1, so that the progress information may be displayed on the display device.

Further, for example, the different information processing apparatus 2 may be configured to execute the first and second programs, like the information processing apparatus 1. As long as at least either one of the information processing apparatus 1 and the different information processing apparatus 2 is able to perform prescribed processes without fail, it is possible to keep performing the processes based on the first and second programs.

For example, at least while in the above first to third states, the information processing apparatus 1 is not able to keep performing the whole processes based on the first and second programs properly. However, in the first to third states, the different information processing apparatus 2 executes the first and second programs or the updated version of the programs. Therefore, the information processing apparatus 1 is able to update the programs while the different processing apparatus 2 takes over the processes based on the programs.

Second Embodiment

The following describes, as a second embodiment, a storage system that includes storage control apparatuses where two virtual OS programs run independently, by way of example. In this storage system, the two virtual OS programs that run on at least one of the storage control apparatuses are an example of the first and second programs illustrated in FIG. 1.

Figure 2:
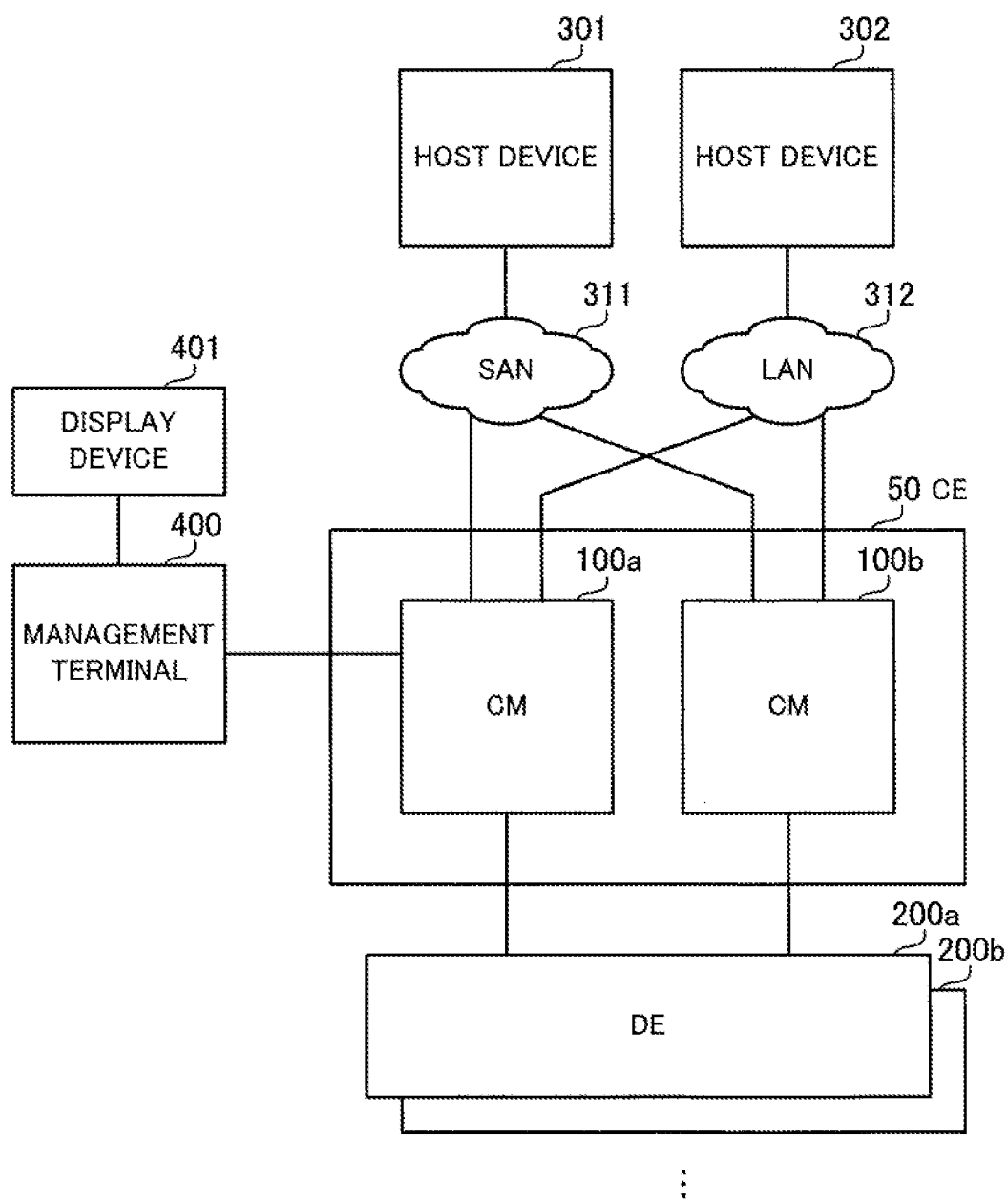
FIG. 2 illustrates an example of a configuration of a storage system according to a second embodiment.

FIG. 2 illustrates an example of a configuration of a storage system according to the second embodiment. A storage system of FIG. 2 includes a Controller Enclosure (CE) 50 and a plurality of Drive Enclosures (DE) 200a, 200b, The CE 50 includes Controller Modules (CM) 100a and 100b each connected to the DEs 200a, 200b, . . . . Host devices 301 and 302 are connected to the CMs 100a and 100b.

The CMs 100a and 100b are storage control apparatuses that control access to storage devices provided in the DEs 200a, 200b, . . . , in response to requests from the host devices 301 and 302. Each of the DEs 200a, 200b, is provided with a plurality of storage devices that are accessed from the host devices 301 and 302. In this embodiment, it is assumed that the DEs 200a, 200b, . . . are disk arrays provided with Hard Disk Drives (HDD) as the storage devices, by ways of example.

In addition, a management terminal 400 is connected to the CM 100a. A display device 401 is connected to the management terminal 400. The management terminal 400 is a terminal device that is operated by an administrator of the storage system. For example, the administrator is able to operate the management terminal 400 to update firmware for the CMs 100a and 100b and DEs 200a, 200b, . . . and to confirm the progress state of the update from information displayed on the display device 401.

By the way, the host device 301 is connected to the CMs 100a and 100b via a Storage Area Network (SAN) 311. The host device 301 makes access requests, each for a single block, to the CMs 100a and 100b. For example, the host device 301 communicates with the CMs 100a and 100b using a communication protocol, such as a Fibre Channel (FC) or Internet Small Computer System Interface (iSCSI).

The host device 302 is connected to the CMs 100a and 100b via a LAN 312. The host device 302 makes access requests, each for a single file, to the CMs 100a and 100b. For example, the host device 302 communicates with the CMs 100a and 100b using a communication protocol, such as a Network File System (NFS) or Common Internet File System (CIFS).

The CMs 100a and 100b operate as "unified storage" using two communication protocols that employ different amounts of data to be accessed at a time. The CMs 100a and 100b each have both a processing function of controlling access to the DEs 200a, 200b, in response to block-based access requests and a processing function of controlling access to the DEs 200a, 200b, . . . in response to file-based access requests. As will be described later, the CMs 100a and 100b each execute these two processing functions on firmware running on different virtual machines.

Figure 3:
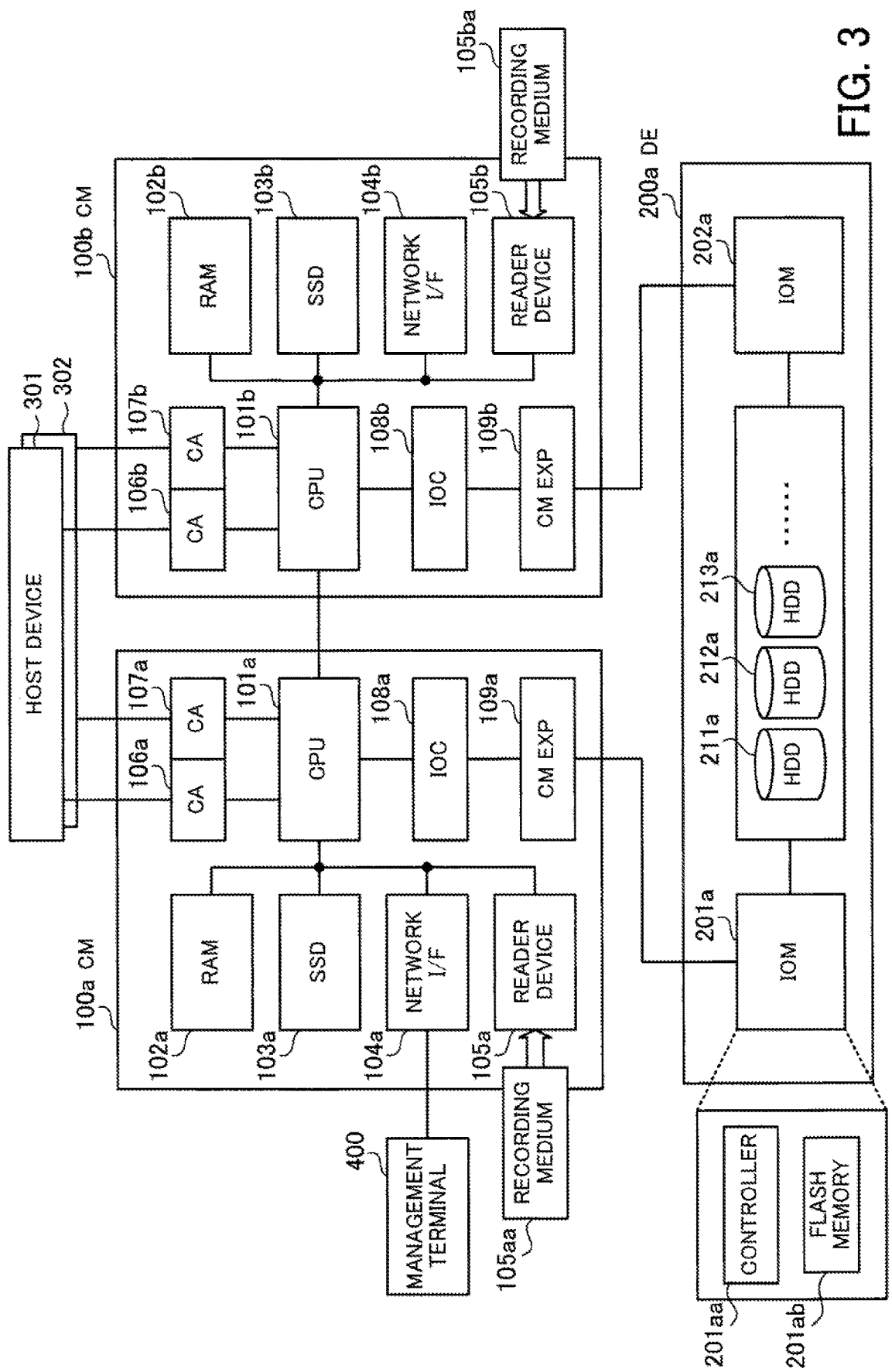
FIG. 3 illustrates an example of hardware configurations of Controller Modules (CMs) and a Drive Enclosure (DE)

FIG. 3 illustrates an example of hardware configurations of CMs and a DE.

The CM 100a includes a Central Processing Unit (CPU) 101a, a Random Access Memory (RAM) 102a, a Solid State Drive (SSD) 103a, a network interface (I/F) 104a, a reader device 105a, channel Adapters (CA) 106a and 107a, an In/Out Controller (IOC) 108a, and a CM expander (EXP) 109a.

The CPU 101a exercises the overall control of the CM 100a. For example, the CPU 101a includes one or a plurality of processors. The RAM 102a is a primary storage device of the CM 100a, and temporarily stores part of programs that are executed by the CPU 101a and various data that is used by the CPU 101a in processing.

The SSD 103a is an auxiliary storage device of the CM 100a. The SSD 103a includes a firmware area for storing firmware that is executed by the CPU 101a. The firmware includes a virtual OS program and an application program for implementing access control in response to block-based access requests, and a virtual OS program and an application program for implementing access control in response to file-based access requests.

In addition, the SSD 103a includes a cache area that is used for access control, for example. In this connection, the firmware area and cache area may be implemented by using separate storage devices. Further, the CM 100a may be provided with an HDD as an auxiliary storage device, in place of the SSD 103a.

The network interface 104a connects with another device over a network, not illustrated, to communicate data with the other device. In this embodiment, the management terminal 400 is connected to the network interface 104a.

A portable recording medium 105aa is attachable to or detachable from the reader device 105a. The reader device 105a reads data from the recording medium 105aa and gives the data to the CPU 101a. As the recording medium 105aa, an optical disc, a magneto-optical disk, a semiconductor memory, or another may be used.

The CA 106a connects with the host device 301 via the SAN 311 to communicate data with the host device 301. The CA 107a connects with the host device 302 via the LAN 312 to communicate data with the host device 302.

The IOC 108a exchanges data with the CPU 101a and the CM expander 109a. The CM expander 109a relays data between the IOC 108a and a DE. Referring to the example of FIG. 3, the CM expander 109a connects with the DE 200a. In this connection, in this embodiment, data is communicated between the IOC 108a and a DE using a Serial Attached SCSI (SAS) protocol. Therefore, the CM expander 109a operates as an SAS expander. In addition, the CM expander 109a is able to connect with a plurality of DEs to relay data between the IOC 108a and each of the plurality of DEs.

The CM 100b includes a CPU 101b, a RAM 102b, an SSD 103b, a network interface 104b, a reader device 105b, CAs 106b and 107b, an IOC 108b, and a CM expander 109b. The CM 100b has the same hardware configuration as the CM 100a. The CPU 101b, RAM 102b, SSD 103b, network interface 104b, reader device 105b, CAs 106b and 107b, IOC 108b, and CM expander 109b of the CM 100b correspond to the CPU 101a, RAM 102a, SSD 103a, network interface 104a, reader device 105a, CAs 106a and 107a, IOC 108a, and CM expander 109a of the CM 100a, respectively. In addition, a portable recording medium 105ba is attachable to or detachable from the reader device 105b.

The DE 200a includes In/Out Modules (IOM) 201a and 202a and a plurality of HDDs 211a, 212a, 213a, . . . . The IOMs 201a and 202a function as SAS expanders. The IOM 201a relays data at least between the CM 100a and each of the HDDs 211a, 212a, 213a, The IOM 202a relays data at least between the CM 100b and each of the HDDs 211a, 212a, 213a, The HDDs 211a, 212a, 213a, . . . are storage devices that are accessed from the host devices 301 and 302.

In this connection, the IOM 201a includes a controller 201aa and a flash memory 201ab. The flash memory 201ab includes a firmware area for holding firmware. The controller 201aa performs data relay and other processes according to the firmware stored in the firmware area.

The IOM 202a has the same hardware configuration as the IOM 201a. In addition, the CM expanders 109a and 109b each include a flash memory including a firmware area for holding firmware and a controller that operates with the firmware. Storage devices having such firmware areas are not limited to flash memories, and another type of non-volatile storage devices may be used.

In this connection, although not illustrated, each of the host devices 301 and 302 and the management terminal 400 is implemented as a computer including a processor, a RAM, and others, for example.

Figure 4:
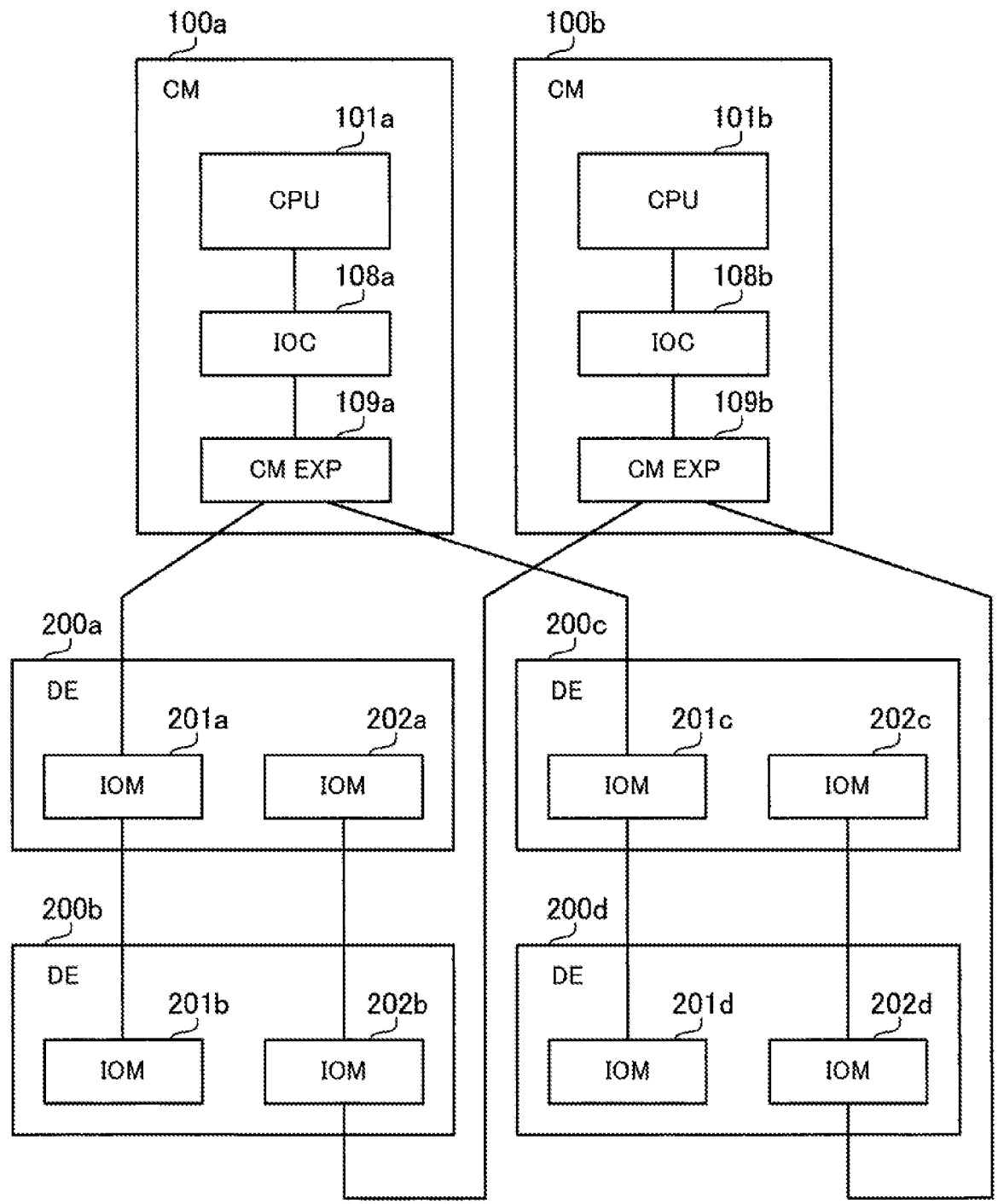
FIG. 4 illustrates an example of connecting CMs and DEs.

FIG. 4 illustrates an example of connecting CMs and DEs. Referring to the example of FIG. 4, four DEs 200a to 200d are connected to each of the CMs 100a and 100b.

The IOM 201a of the DE 200a and an IOM 201b of the DE 200b are connected in series to the CM expander 109a of the CM 100a, and an IOM 201c of the DE 200c and an IOM 201d of the DE 200d are also connected in series thereto. In this case, the CM expander 109a relays data between the IOC 108a and each of the IOMs 201a and 201c.

An IOM 202b of the DE 200b and the IOM 202a of the DE 200a are connected in series to the CM expander 109b of the CM 100b, and an IOM 202d of the DE 200d and an IOM 202c of the DE 200c are also connected in series thereto. In this case, the CM expander 109b relays data between the IOC 108b and each of the IOMs 202b and 202d.

The following describes the storage system configured as illustrated in FIG. 4, by way of example. In addition, the IOMs 201a to 201d connected to the CM 100a may be described as "0-series IOMs", whereas the IOMs 202a to 202d connected to the CM 100b may be described as "1-series IOMs".

Figure 5:
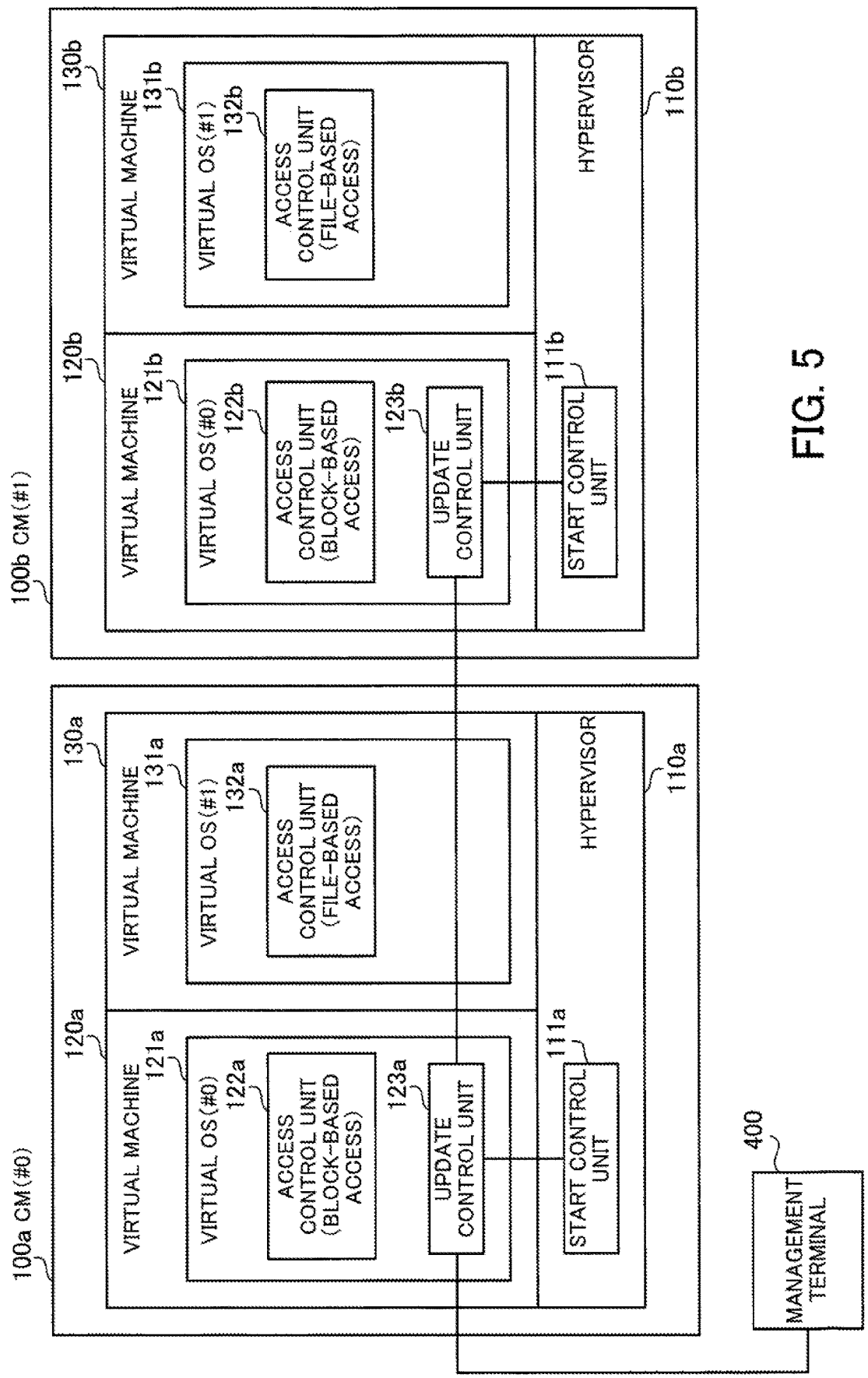
FIG. 5 is a block diagram illustrating an exemplary configuration of processing functions of CMs.

FIG. 5 is a block diagram illustrating an exemplary configuration of processing functions of CMs. The CM 100a includes a hypervisor 110a and virtual machines 120a and 130a.

Processes of the hypervisor 110a are implemented by causing the CPU 101a of the CM 100a to execute a hypervisor program. The hypervisor 110a configures virtual machines 120a and 130a and manages their operations. In addition, the hypervisor 110a includes a start control unit 111a. The start control unit 111a is a function corresponding to the Basic Input/Output System (BIOS) for the virtual machines 120a and 130a, and controls the start of programs on the virtual machines 120a and 130a.

The virtual machines 120a and 130a operate under the management of the hypervisor 110a. The CM 100a includes a virtual OS 121a, an access control unit 122a, and an update control unit 123a as processing functions implemented on the virtual machine 120a. Processes of the virtual OS 121a are implemented by the virtual machine 120a running an OS program. Processes of the access control unit 122a and update control unit 123a are implemented by causing the virtual machine 120a to execute prescribed application programs on the virtual OS 121a.

The access control unit 122a receives block-based access requests from the host device 301, and accesses the HDDs in the DEs 200a to 200d in response to the requests.

The update control unit 123a controls a firmware update process in the storage system in accordance with instructions from the management terminal 400. In addition, the update control unit 123a notifies the management terminal 400 of information indicating the progress state of the firmware update process in response to requests from the management terminal 400.

In addition, the CM 100a includes a virtual OS 131a and access control unit 132a as processing functions implemented on the virtual machine 130a. Processes of the virtual OS 131a are implemented by the virtual machine 130a running an OS program. Processes of the access control unit 132a are implemented by causing the virtual machine 130a to execute a prescribed application program on the virtual OS 131a.

The access control unit 132a receives file-based access requests from the host device 302, and accesses the HDDs in the DEs 200a to 200d in response to the requests. For example, the access control unit 132a converts file-based access requests to block-based access requests and then accesses the HDDs. In this case, for example, the access control unit 132a may request the access control unit 122a to make the block-based access, in order to access the HDDs.

The CM 100a has the same functions as the CM 100b. That is, the CM 100b includes a hypervisor 110b, and virtual machines 120b and 130b that operate under the control of the hypervisor 110b. The hypervisor 110b includes a start control unit 111b that controls the start of programs on the virtual machines 120b and 130b.

The CM 100b includes a virtual OS 121b, an access control unit 122b, and an update control unit 123b as processing functions implemented on the virtual machine 120b. The virtual OS 121b, access control unit 122b, and update control unit 123b perform the same processes as the virtual OS 121a, access control unit 122a, and update control unit 123a, respectively.

In addition, the CM 100b includes a virtual OS 131b and an access control unit 132b as processing functions implemented on the virtual machine 130b. The virtual OS 131b and access control unit 132b perform the same processes as the virtual OS 131a and access control unit 132a, respectively.

The access control units 122a and 122b are able to access the same logical volume in response to an access request from the host device 301. Similarly, the access control units 132a and 132b are also able to access the same logical volume in response to an access request from the host device 302. In this connection, logical volumes are logical storage areas that are implemented by using physical storage space of certain HDDs in the DEs 200a to 200d.

That is to say, in this storage system, redundant control devices are configured with the CMs 100a and 100b, for controlling access to the HDDs in the DEs 200a to 200d from the host devices 301 and 302. By doing so, as long as at least one of the CMs 100a and 100b operates properly, the host devices 301 and 302 are able to access the HDDs in the DEs 200a to 200d.

For example, in the case where a multipath is configured for the host devices 301 and 302, the host devices 301 and 302 select a CM running properly from the CMs 100a and 100b, and access the HDDs in the DEs 200a to 200d via the selected CM. Alternatively, one of the CMs 100a and 100b may be set as an active device and the other may be set as a standby device, and then the host devices 301 and 302 may access the HDDs in the DEs 200a to 200d via the CM acting as the active device. To this end, for example, data in cache areas used for controlling access to the HDDs in the DEs 200a to 200d may be synchronized between the access control units 122a and 122b and between the access control units 132a and 132b.

In addition, one of the update control units 123a and 123b may act as a master, and the other may act as a slave that operates under the control of the master unit. In other words, the firmware update process in the CMs 100a and 100b is performed under the control of the master unit out of the update control units 123a and 123b.

In the following description, the update control unit 123a acting as a master or a slave means the CM 100a acting as a master or a slave. Similarly, the update control unit 123b acting as a master or a slave means the CM 100b acting as a master or a slave. That is, a master CM operates as a control device for controlling the firmware update process, and a slave CM operates as a controlled device to be controlled for the firmware update process.

In addition, as illustrated in FIG. 5, in the embodiment, the management terminal 400 is connected to the CM 100a. In this case, the update control unit 123a of the CM 100a communicates with the management terminal 400 to start the firmware update process in response to an instruction from the management terminal 400, and sends information indicating the progress state of the firmware update process in response to a request from the management terminal 400. In this connection, in the case where a management terminal is connected to the CM 100b, the update control unit 123b of the CM 100b communicates with the management terminal to perform the above processes.

In the following description, the CM 100a may be described as "CM #0", the CM 100b as "CM #1", the virtual OSs 121a and 121b as "Virtual OS #0", and the virtual OSs 131a and 131b as "virtual OS #1".

Figure 6:
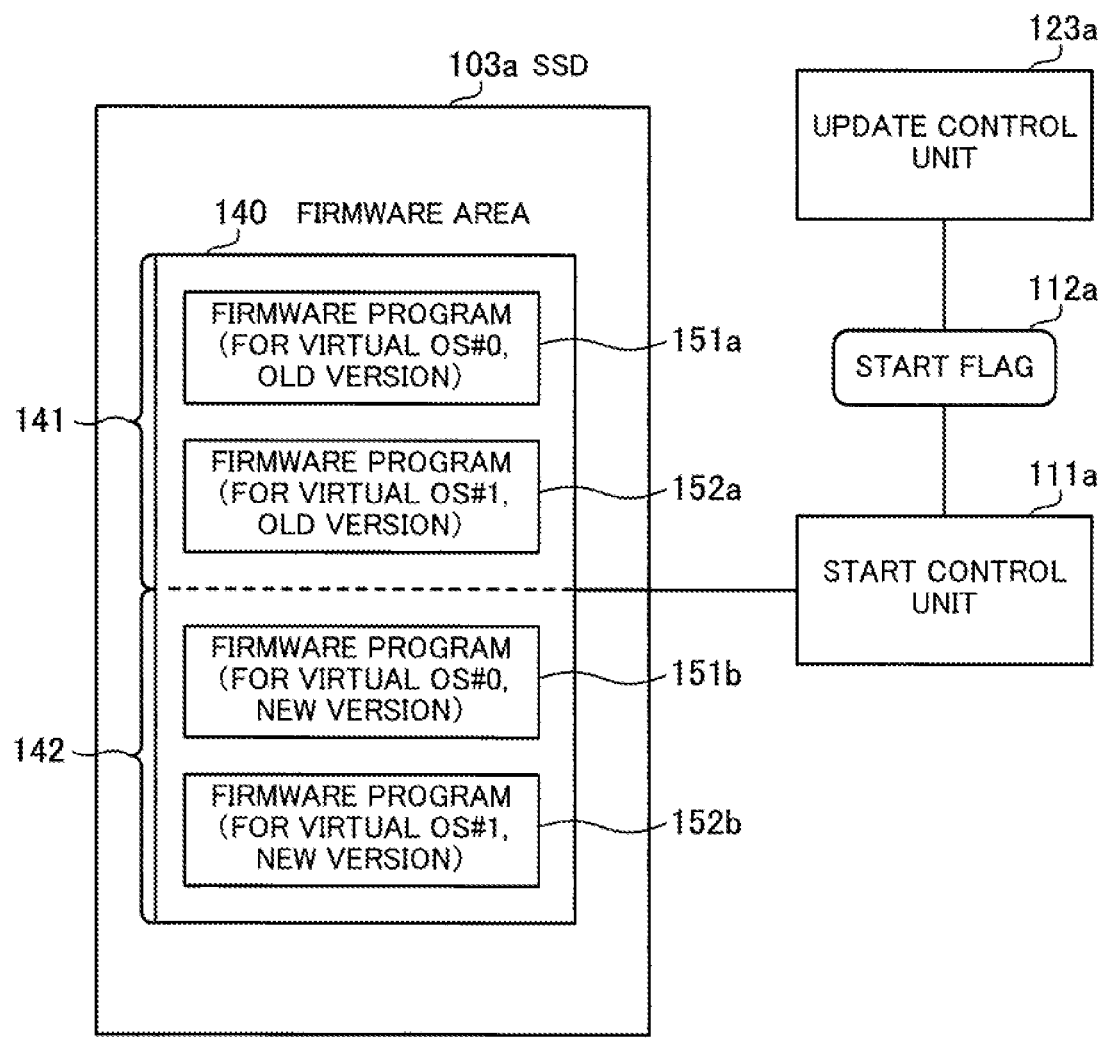
FIG. 6 illustrates an example of a method of updating firmware for a CM.

FIG. 6 illustrates an example of a method of updating firmware for a CM. In the SSD 103a of the CM 100a, a firmware area 140 for holding firmware is previously set aside. The firmware area 140 is divided into two firmware areas 141 and 142 for holding different versions of firmware.

Referring to the example of FIG. 6, old version firmware programs 151a and 152a are stored in the firmware area 141, whereas new version firmware programs 151b and 152b are stored in the firmware area 142. The firmware programs 151a and 151b each include a virtual OS program corresponding to the virtual OS 121a (the virtual OS #0), and application programs respectively corresponding to the access control unit 122a and update control unit 123a that run on the virtual OS 121a. The firmware programs 152a and 152b each include a virtual OS program corresponding to the virtual OS 131a (the virtual OS #1), and an application program corresponding to the access control unit 132a that runs on the virtual OS 131a. In this connection, the virtual OS programs and application programs may be stored in the firmware areas 141 and 142 as separate program modules.

A start flag 112a is stored in a non-volatile storage area (for example, a prescribed space in the SSD 103a) of the CM 100a. The start flag 112a is flag information indicating which firmware the CPU 101a executes when the CM 100a starts, the firmware stored in the firmware area 141 or the firmware stored in the firmware area 142.

For example, consider the case where the update control unit 123a rewrites the start flag 112a to indicate the firmware area 142 while the firmware programs 151a and 152a stored in the firmware area 141 are running. After that, when the CM 100a is rebooted (that is, powered off and then on) in response to an instruction from the CM 100b, the hypervisor 110a starts, and the start control unit 111a starts accordingly. The start control unit 111a reads the firmware programs 151b and 152b from the firmware area 142 in accordance with the start flag 112a. Thereby, the firmware programs 151b and 152b are executed by the CPU 101a. In this way, the firmware is updated by switching which area to read the firmware from.

In this connection, in the CM 100b, the firmware is updated by switching which area to read the firmware from, in the same way as described above. In addition, for each of the CM expanders 109a and 109b and IOMs 201a to 201d and 202a to 202d, two firmware areas are set aside in its local flash memory, and the firmware is updated by switching which area to read the firmware from after a reboot.

The following describes how to update firmware in the storage system. First, an example of a firmware update process, used for comparison, and problems that occur in this example will be described with reference to FIG. 7, and then the firmware update process of the second embodiment will be described with reference to FIGS. 8 to 10.

Figure 7:
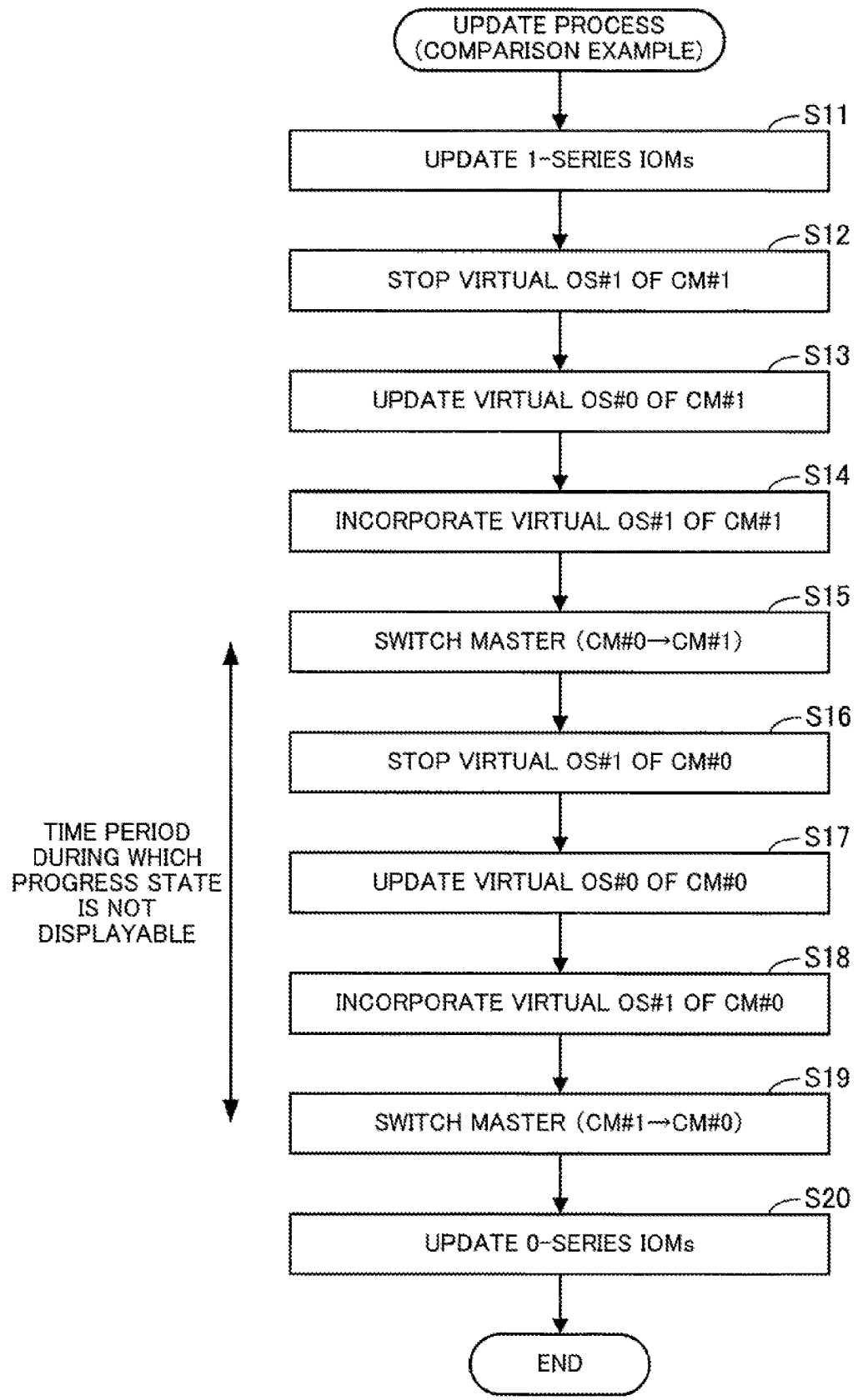
FIG. 7 is a flowchart illustrating a comparison example of a firmware update process.

FIG. 7 is a flowchart illustrating a comparison example of a firmware update process. It is assumed that, when the process of FIG. 7 starts, the CM 100a acts as a master and the CM 100b acts as a slave.

In this comparison example of FIG. 7, first, firmware is updated in the CM 100b (CM #1) and 1-series IOMs connected thereto (steps S11 to S14). After that, firmware is updated in the CM 100a (CM #0) and 0-series IOMs connected thereto (steps S16 to S18 and S20).

More specifically, under the control of the update control unit 123a of the CM 100a, the firmware for the 1-series IOMs (IOMs 202a to 202d) connected to the CM 100b is updated (step S11). After that, under the control of the update control unit 123a, the operation of the access control unit 132b is stopped, and the operation of the virtual OS 131b (the virtual OS #1 of the CM #1) is stopped (step S12).

Subsequently, under the control of the update control unit 123a, the virtual OS 121b (the virtual OS #0 of the CM #1) is updated (step S13). More specifically, the start flag for the CM 100b is rewritten, the operations of the access control unit 122b and update control unit 123b are stopped, and the operation of the virtual OS 121b is stopped. Then, when the CM 100b is rebooted, the virtual OS 121b, access control unit 122b, and update control unit 123b start with new version firmware. In this connection, in step S13, firmware for the CM expander 109b is also updated by the reboot of the CM 100b.

Next, under the control of the update control unit 123a, the virtual OS 131b and access control unit 132b start with new version firmware. Thereby, the virtual OS 131b and access control unit 132b are incorporated (step S14).

After the above process is complete, the update control unit 123a switches the role of the CM 100b to the master and the role of the CM 100a to the slave (step S15). Then, under the control of the update control unit 123b of the CM 100b, the operation of the access control unit 132a is stopped and the operation of the virtual OS 131a (the virtual OS #1 of the CM #0) is stopped (step S16).

Further, under the control of the update control unit 123b, the virtual OS 121a (the virtual OS #0 of the CM #0) is updated (step S17). More specifically, the start flag 112a for the CM 100a is rewritten, the operations of the access control unit 122a and update control unit 123a are stopped, and the operation of the virtual OS 121a is stopped. Then, when the CM 100a is rebooted, the virtual OS 121a, access control unit 122a, and update control unit 123a start with new version firmware. In this connection, in step S17, the firmware for the CM expander 109a is also updated by the reboot of the CM 100a.

Then, under the control of the update control unit 123b, the virtual OS 131a and access control unit 132a start with new version firmware. Thereby, the virtual OS 131a and access control unit 132a are incorporated (step S18).

After the above process is complete, the update control unit 123b switches the role of the CM 100a to the master and the role of the CM 100b to the slave (step S19). Then, under the control of the update control unit 123a of the CM 100a, the firmware for the 0-series IOMs (IOMs 201a to 201d) connected to the CM 100a is updated (step S20).

In the above steps S11 to S14, it is possible to update the firmware for the CM 100b and 1-series IOMs while the CM 100a keeps performing access control. In addition, in the above steps S16 to S20, it is possible to update the firmware for the CM 100a and 0-series IOMs while the CM 100b keeps performing the access control. This enables so-called "active firmware update", which updates the firmware without stopping the access control performed in response to requests from the host devices 301 and 302.

By the way, in the above steps S11 to S14 and S20 where the CM 100a acts as the master, the update control unit 123a is able to send progress information indicating the progress state of the firmware update in response to a request from the management terminal 400. However, in the above steps S16 to S18 where the CM 100a acts as the slave, the update control unit 123a is unable to control the progress of the firmware update. Therefore, during this time period, the update control unit 123a is unable to send the progress information even when receiving a request from the management terminal 400.

Therefore, in steps S16 to S18, the management terminal 400 is unable to update display information on the progress state displayed on the display device 401, and this prevents the administrator from determining whether the firmware update is in progress or not. In steps S16 to S18, two virtual OS programs are restarted, and therefore, it takes a long time to complete the process, compared with the case where a single OS program is restarted. If a trouble occurs in the restart process, it takes a long time for the administrator to notice the occurrence of the trouble, which causes a delay in the countermeasures against the trouble. Further, even if no trouble occurs, the display information on the progress state displayed on the display device 401 is not updated for a long time, which reduces the usability.

In addition, before the master is switched in step S15, for example, the update control unit 123a notifies the management terminal 400 of a suspension time period indicating how long to stop the transmission of transmission requests for progress information. By stopping the transmission of transmission requests for progress information until the specified suspension time period passes, the management terminal 400 is able to avoid wasted communication. This suspension time period is set to the maximum time period taken to complete the restart of all of the two virtual OS programs and application programs. Therefore, if the restart is completed before the suspension time period passes, the management terminal 400 does not resume the transmission of transmission requests for progress information. Therefore, it may take a longer time than needed to resume the update of the display information on the progress state displayed on the display device 401.

To deal with this, the storage system of the second embodiment changes when to switch a master from the CM 100a to the CM 100b so as to update only the virtual OS 121a while the CM 100a acts as the slave. This reduces the time taken until the update of the display information on a progress state displayed on the display device 401 is resumed.

Note that it may be configured so that, even when the CM 100a acts as the slave, the update control unit 123a sends progress information in response to a request from the management terminal 400 in steps S16 and S18 where the update control unit 123a operates. In this case, the time period during which it is not possible to send progress information is limited to the time period of step S17. However, the management terminal 400 does not recognize the start time and completion time of the execution of step S17, and therefore progress information is not always returned in response to a request from the management terminal 400 during the time period of steps S16 to S18.

If progress information is not returned when the management terminal 400 makes a request for progress information, the management terminal 400 may erroneously determine that a trouble has occurred in the firmware update. To prevent such an erroneous determination, it is preferable that the management terminal 400 be notified of the above-described suspension time period so as not to make requests for progress information during the time period of steps S16 to S18. Therefore, even in the case where the update control unit 123a operates and is therefore able to send progress information while the CM 100a acts as the slave, the same problem as described above occurs, where it takes a long time to resume the update of the display information on a progress state displayed on the display device 401.

Figure 8:
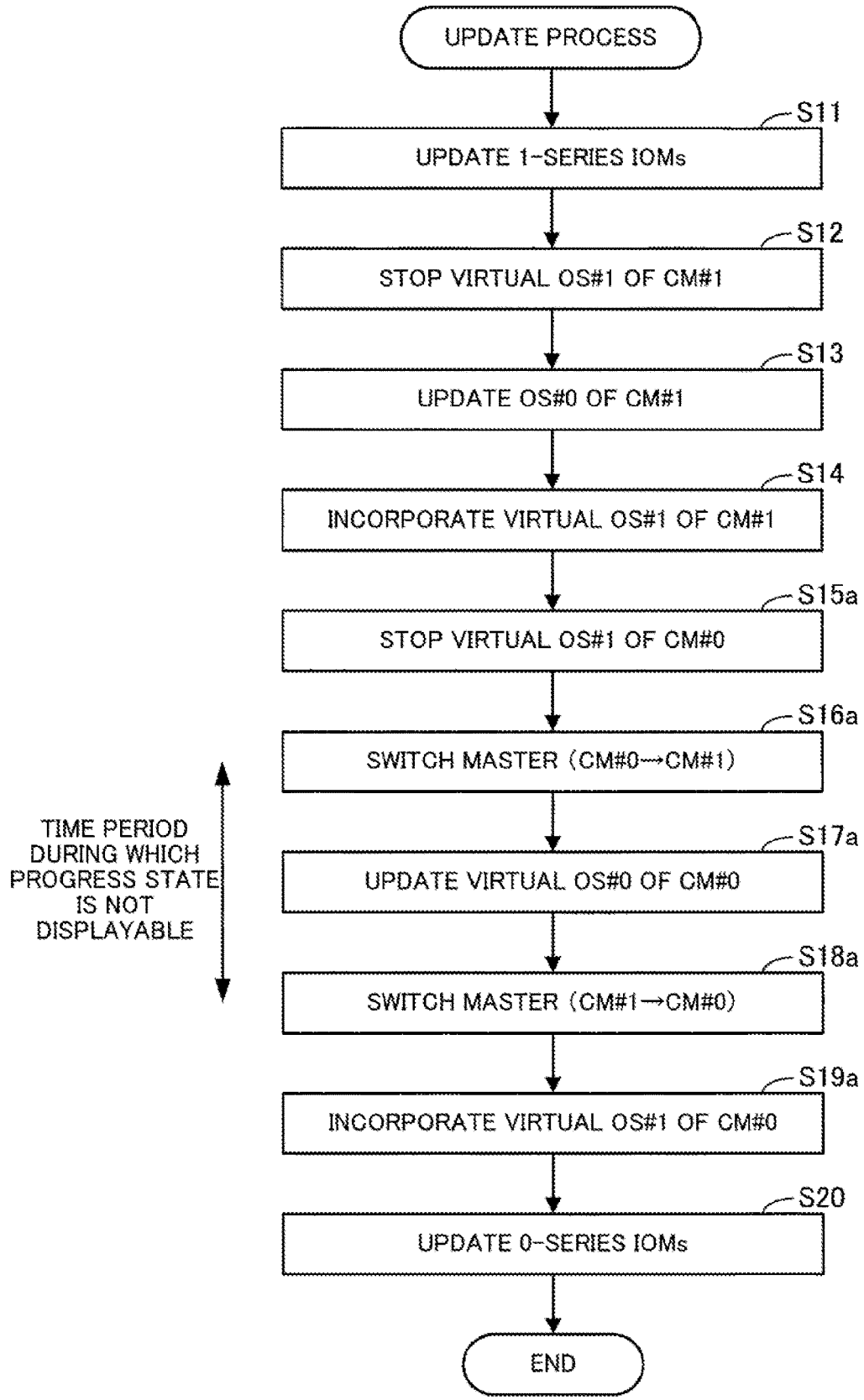
FIG. 8 is a flowchart illustrating an example of a firmware update process according to the second embodiment.

FIG. 8 is a flowchart illustrating an example of a firmware update process according to the second embodiment. In FIG. 8, the same numbers as used in FIG. 7 are applied to corresponding steps.

The process of FIG. 8 includes steps S15a to S19a, in place of steps S15 to S19 of FIG. 7. The processing contents of steps S15a, 16a, 17a, 18a, and 19a are the same as those of steps S16, S15, S17, S19, and S18 of FIG. 7, respectively. That is to say, in the process of FIG. 8, before a master is switched to the CM 100b in step S16a, the virtual OS 131a (the virtual OS #1 of the CM #0) that is not related to the progress display is stopped in step S15a. In addition, before the virtual OS 131a is incorporated in step S19a, the master is switched to the CM 100a in step S18a.

This reduces the time period during which it is not possible to update the display information on a progress state displayed on the display device 401. In addition, in the case where the update control unit 123a notifies the management terminal 400 of a suspension time period before the master is switched in step S16a, the suspension time period may be set to the maximum time taken to complete the restart of a single virtual OS program and application programs that run on it. This reduces the time period during which the management terminal 400 is prevented from making requests for progress information, which in turn reduces the time period during which it is not possible to update the display information on the progress state. Note that, even while the CM 100a acts as the slave, these effects are achieved in a configuration in which the update control unit 123a is able to send progress information as long as it operates.

Figure 9:
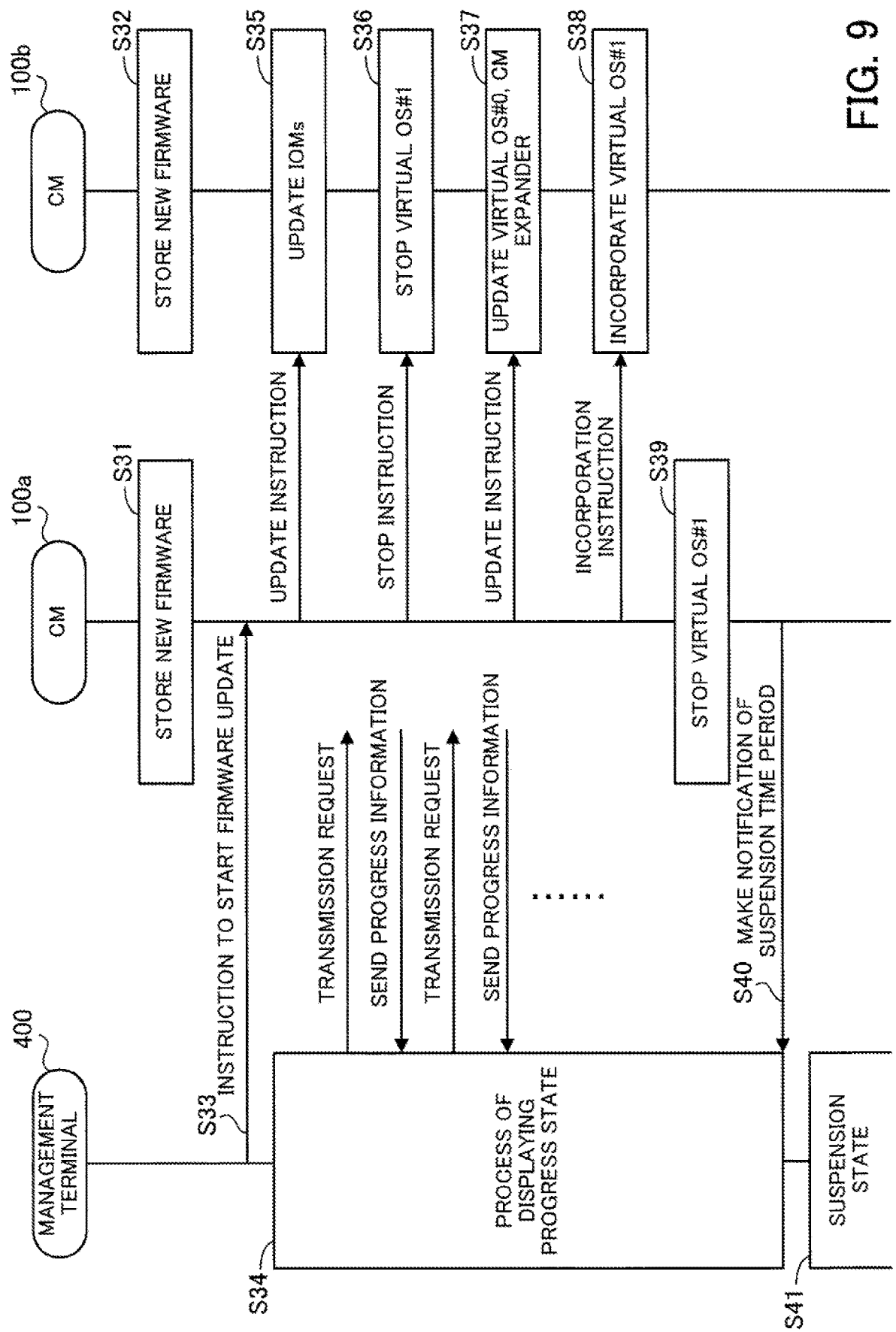
FIGS. 9 and 10 are sequence diagrams illustrating an example of a firmware update process according to the second embodiment.
Figure 10:
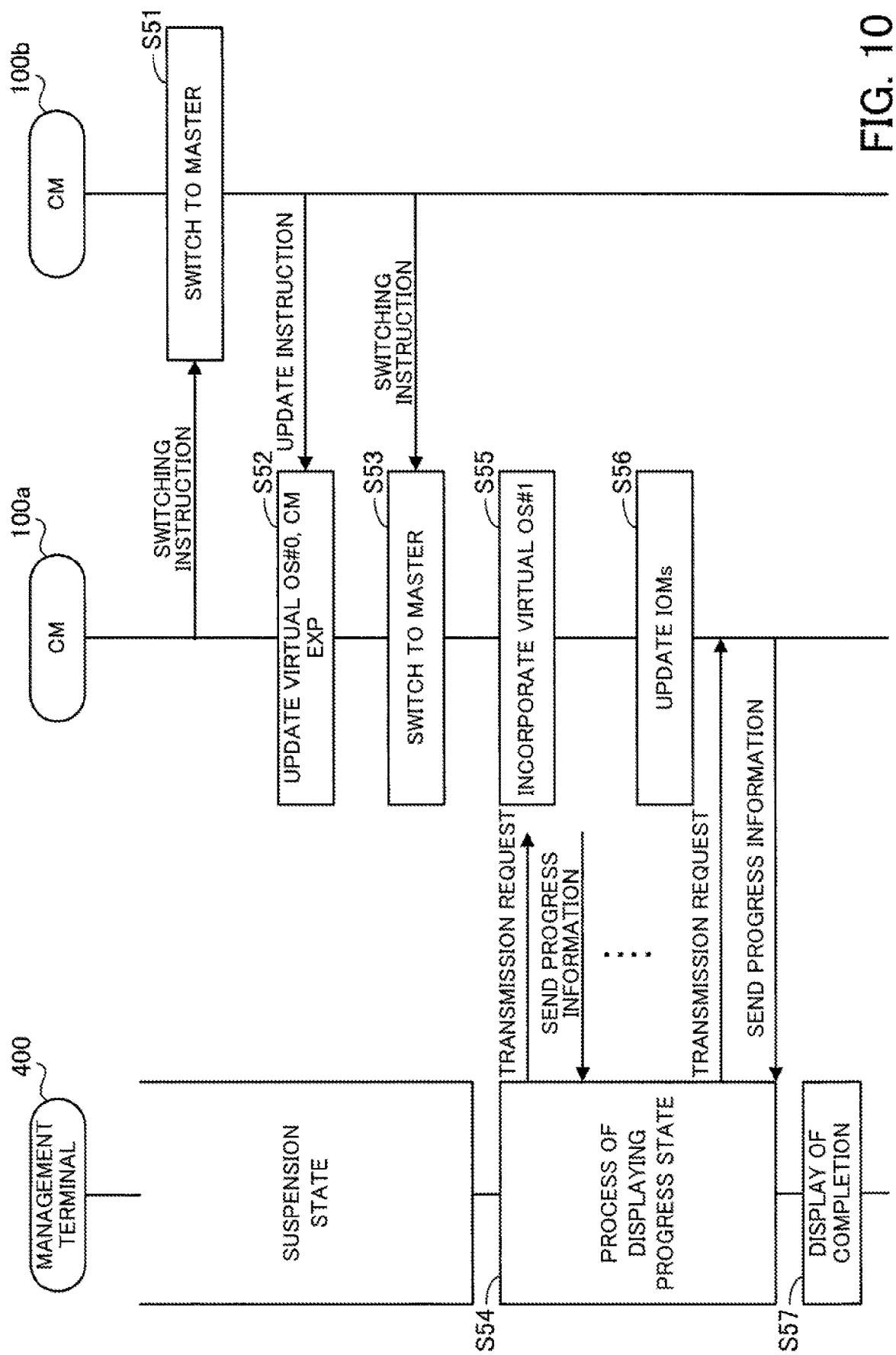

The following describes in detail how to update firmware according to the second embodiment, with reference to sequence diagrams. FIGS. 9 and 10 are sequence diagrams illustrating an example of a firmware update process according to the second embodiment. It is assumed that as the initial state of FIG. 9, the CM 100a acts as a master and the CM 100b acts as a slave.

(Step S31) New version firmware is stored in the firmware area of each of the SSD 103a and CM expander 109a of the CM 100a and the IOMs 201a to 201d.

(Step S32) New version firmware is stored in the firmware area of each of the SSD 103b and CM expander 109b of the CM 100b and the IOMs 202a to 202d.

(Step S33) The management terminal 400 sends an instruction to start a firmware update process to the update control unit 123a of the CM 100a in accordance with administrator's operation.

(Step S34) The management terminal 400 starts to send transmission requests for progress information to the update control unit 123a. For example, the management terminal 400 sends a transmission request at fixed time intervals. The update control unit 123a sends the management terminal 400 progress information indicating the current progress state in response to the transmission request. The management terminal 400 updates display information displayed on the display device 401 on the basis of the received progress information.

(Step S35) The update control unit 123a instructs the update control unit 123b of the CM 100b to update the firmware for the IOMs. The update control unit 123b rewrites the start flags related to the firmware areas of the IOMs 202a to 202d, and restarts the IOMs 202a to 202d. Thereby, the firmware for the IOMs 202a to 202d is updated.

(Step S36) The update control unit 123a instructs the update control unit 123b to stop the virtual OS 131b (the virtual OS #1 of the CM #1). The update control unit 123b stops the operation of the access control unit 132b and the operation of the virtual OS 131b.

(Step S37) The update control unit 123a instructs the update control unit 123b to update the virtual OS 121b (the virtual OS #0 of the CM #1) and the CM expander 109b.

More specifically, first the update control unit 123a makes an instruction to rewrite the start flag for the CM 100b and the start flag related to the firmware area of the CM expander 109b. The update control unit 123b performs the instructed process. Then, the update control unit 123a reboots the CM 100b.

When the CM 100b is rebooted, the new version firmware programs corresponding to the virtual OS 121b, access control unit 122b, and update control unit 123b are executed by the CPU 101b. The virtual OS 121b, access control unit 122b, and update control unit 123b start with their corresponding firmware programs accordingly. In addition, the CM expander 109b starts to run its new version firmware. In this way, the virtual OS 121b, access control unit 122b, update control unit 123b, and CM expander 109b are updated.

(Step S38) The update control unit 123a instructs the update control unit 123b to incorporate the virtual OS 131b (the virtual OS #1 of the CM #1). The update control unit 123b instructs the start control unit 111b to execute the corresponding firmware programs. Thereby, the new version firmware programs corresponding to the virtual OS 131b and access control unit 132b are executed by the CPU 101b. The virtual OS 131b and access control unit 132b start with their corresponding firmware programs accordingly. In this way, the virtual OS 131b and access control unit 132b are updated.

(Step S39) The update control unit 123a stops the access control unit 132a and virtual OS 131a (the virtual OS #1 of the CM #0).

(Step S40) The update control unit 123a notifies the management terminal 400 of a suspension time period. The suspension time period is set to a time taken to complete the start of the new version firmware programs corresponding to the virtual OS 121a, access control unit 122a, and update control unit 123a. As the suspension time period, a previously stored value is sent, for example.

(Step S41) When receiving the notification of the suspension time period, the management terminal 400 stops the transmission of transmission requests for progress information and starts to count the time. The management terminal 400 does not transmit transmission requests until the specified suspension time period passes.

(Step S51) The update control unit 123a instructs the update control unit 123b to switch to the master. Thereby, the CM 100b switches its role to the master, and the CM 100a switches its role to the slave.

(Step S52) The update control unit 123b instructs the update control unit 123a to update the virtual OS 121a (the virtual OS #0 of the CM #0) and the CM expander 109a.

More specifically, the update control unit 123b first makes an instruction to rewrite the start flag 112a for the CM 100a and the start flag related to the firmware area of the CM expander 109a. The update control unit 123a performs the instructed process. Then, the update control unit 123b reboots the CM 100a.

When the CM 100a is rebooted, the new version firmware programs corresponding to the virtual OS 121a, access control unit 122a, and update control unit 123a are executed by the CPU 101a. The virtual OS 121a, access control unit 122a, and update control unit 123a start with their corresponding firmware programs accordingly. In addition, the CM expander 109a starts to execute its new version firmware. In this way, the virtual OS 121a, access control unit 122a, update control unit 123a, and CM expander 109a are updated.

(Step S53) When the execution of step S52 is complete, the update control unit 123b instructs the update control unit 123a to switch to the master. Thereby, the CM 100a switches its role to the master and the CM 100b switches its role to the slave.

(Step S54) When detecting that the specified suspension time period has passed, the management terminal 400 resumes the transmission of transmission requests for progress information to the update control unit 123a. Since the CM 100a now acts as the master, the update control unit 123a sends progress information to the management terminal 400 in response to the transmission request. The management terminal 400 updates the display information displayed on the display device 401 on the basis of the received progress information.

After that, the management terminal 400 sends a transmission request at fixed time intervals until it receives progress information indicating the completion of the whole firmware update.

(Step S55) The update control unit 123a incorporates the virtual OS 131a (the virtual OS #1 of the CM #0). More specifically, the update control unit 123a requests the start control unit 111a to execute the firmware programs corresponding to the virtual OS 131a and access control unit 132a. Thereby, the new version firmware programs corresponding to the virtual OS 131a and access control unit 132a are executed by the CPU 101a. The virtual OS 131a and access control unit 132a start with their corresponding firmware programs accordingly. In this way, the virtual OS 131a and access control unit 132a are updated.

(Step S56) The update control unit 123a rewrites the start flag related to the firmware area of each of the IOMs 201a to 201d, and restarts the IOMs 201a to 201d. Thereby, the firmware for the IOMs 201a to 201d is updated.

(Step S57) When the management terminal 400 sends a transmission request for progress information after the execution of step S56 is complete, the update control unit 123a sends progress information indicating the completion of the whole firmware update. The management terminal 400 displays display information indicating the completion of the firmware update on the display device 401. Thereby, the firmware update process is completed.

The above-described process reduces the time period during which the update control unit 123a of the CM 100a is unable to send progress information and the display information on a progress state displayed on the display device 401 is not updated. This improves the usability for the administrator. In addition, if a trouble occurs in the progress during this time period, the administrator is able to recognize the occurrence of the trouble swiftly and take needed countermeasures. Therefore, it is possible to remove the trouble in a short time and improve operation efficiency.

The above processing functions of each apparatus (information processing apparatus 1, CMs 100a and 100b, and management terminal 400) in the above individual embodiments may be implemented by a computer. In this case, a program describing the processing content of the functions implemented by each apparatus is provided. The processing functions are implemented by causing the computer to run the program. The program describing the processing content may be recorded on a computer-readable recording medium. Computer-readable recording media include magnetic storage devices, optical discs, magneto-optical recording media, semiconductor memories, and others. Magnetic storage devices include hard disk drives (HDD), flexible disks (FD), magnetic tapes, and others. Optical discs include Digital Versatile Discs (DVD), DVD-RAMS, Compact Disc-Read Only Memories (CD-ROM), CD-Rs (Recordable), CD-RWs (rewritable), and others. Magneto-optical recording media include Magneto-optical disks (MO) and others.

For example, to distribute the program, portable recording media, such as DVDs and CD-ROMs, on which the program is recorded may be put on sale. Alternatively, the program may be stored in a storage device of a server computer, and may be transferred from the server computer to other computers over a network.

A computer that runs the program may store the program recorded in a portable recording medium or the program received from the server computer in a local storage device. Then, the computer reads the program from the local storage device, and performs processes according to the program. In this connection, the computer may read the program directly from the portable recording medium, and then perform processes according to the program. Alternatively, the computer may perform processes according to the program while receiving the program from the server computer over a network.

According to one aspect, it is possible to reduce the time period during which it is not possible to make a notification of a progress state of a program update.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A program update control method comprising:
   executing, by a computer, a first program and a second program; and
   performing, by the computer, a program update process of updating the first program and the second program each executed by the computer, the program update process includes:
   performing, by the computer, a first process of updating the first program to a first updated program, as a program to be executed by the computer, wherein the computer acts as a slave that performs the program update process in response to an instruction from a different computer; and wherein the first program is related to a fourth process of notifying a management apparatus of a progress state of a third process of updating the second program to a second updated program as a program to be executed by the computer;
   stopping an execution of updating the first program; and
   performing, by the computer, a second process, wherein the computer acts as a master that controls the program update process, the second process including the third process and the fourth process of notifying the management apparatus of a progress state of the third process according to the first program or the first updated program.

2. An information processing apparatus that executes programs, the information processing apparatus comprising:
- a memory storing a first program, a second program, a first updated program, and a second updated program; and
- a processor configured to perform a procedure including:
- executing the first program and the second program stored in the memory; and
- performing a program update process of updating the first program and the second program each executed by the processor, the program update process includes:
  - performing a first process of updating the first program to the first updated program, as a program to be executed by the processor, when the information processing apparatus acts as a slave that performs the program update process in accordance with an instruction from a different information processing apparatus, the first program being related to a fourth process of notifying a management apparatus of a progress state of a third process of updating the second program to the second updated program as a program to be executed by the processor; and
  - performing a second process without updating the first program when the information processing apparatus acts as a master that controls the program update process, the second process including the third process and the fourth process of notifying the management apparatus of a progress state of the third process according to the first program or the first updated program.

3. The information processing apparatus according to claim 2, wherein the executing includes executing the first program and the second program in parallel, and the program update process includes: stopping an execution of the second program according to the first program as the master, transitioning from the master to the slave and performing the first process, upon completion of the first process, transitioning from the slave to the master in response to an instruction from the different information processing apparatus and starting an execution of the first updated program, and performing the second process including the third process and the fourth process, the fourth process being performed according to the first updated program.

4. The information processing apparatus according to claim 2, wherein the first program and the first updated program are executed by a first virtual machine running on the information processing apparatus, and the second program and the second updated program are executed by a second virtual machine running on the information processing apparatus.

5. The information processing apparatus according to claim 2, wherein, when the information processing apparatus acts as the master, the procedure further includes instructing the different information processing apparatus to update a third program that is executed by the different information processing apparatus, and notifying the management apparatus of a progress state of an update of the third program according to the first program or the first updated program.

6. An information processing system comprising:
- a first information processing apparatus and a second information processing apparatus, the first information processing apparatus includes:
- a memory storing a first program, a second program, a first updated program, and a second updated program; and a
- processor configured to perform a procedure including:
- executing the first program and the second program stored in the memory; and
- performing a program update process of updating the first program and the second program each executed by the processor, the program update process includes:
  - performing a first process of updating the first program to the first updated program, as a program to be executed by the processor, when the information processing apparatus acts as a slave that performs the program update process in accordance with an instruction from the second information processing apparatus, the first program being related to a fourth process of notifying a management apparatus of a progress state of a third process of updating the second program to the second updated program as a program to be executed by the processor; and
  - performing a second process without updating the first program when the information processing apparatus acts as a master that controls the program update process, the second process including the third process and the fourth process of notifying the management apparatus of a progress state of the third process according to the first program or the first updated program.

* * * * *